BLUE LATERAL AND PURITY MAGNET ASSEMBLY
Original Filed May 19, 1965 3 Sheets-Sheet 1
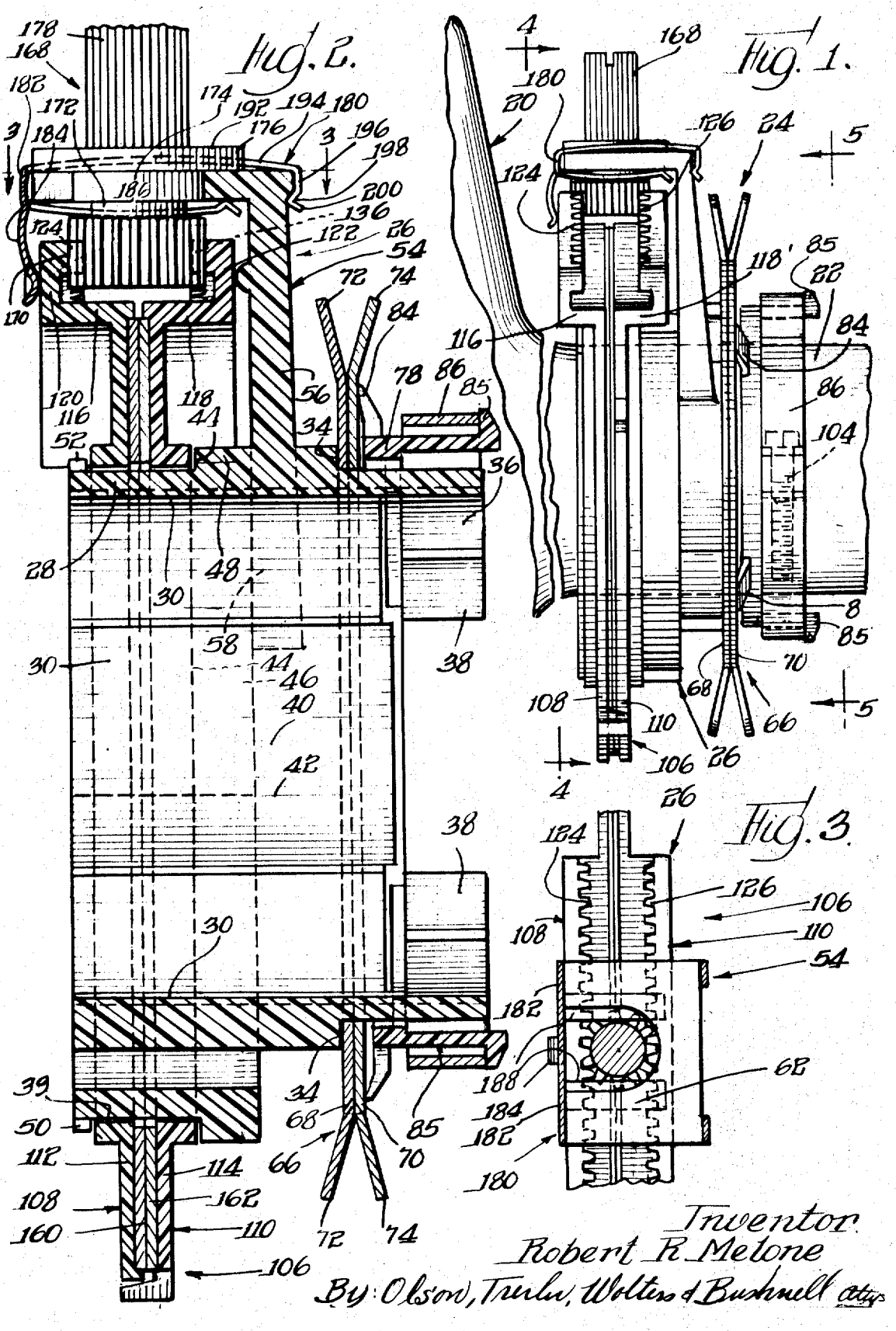
Inventor
Robert R. Melone
By: Olson, Trexler, Wolters & Bushnell Attys

BLUE LATERAL AND PURITY MAGNET ASSEMBLY

Original Filed May 19, 1965 3 Sheets-Sheet 2

Inventor
Robert R. Melone
By: Olson, Trexler Wolters & Bushnell

BLUE LATERAL AND PURITY MAGNET ASSEMBLY
Original Filed May 19, 1965 3 Sheets-Sheet 3
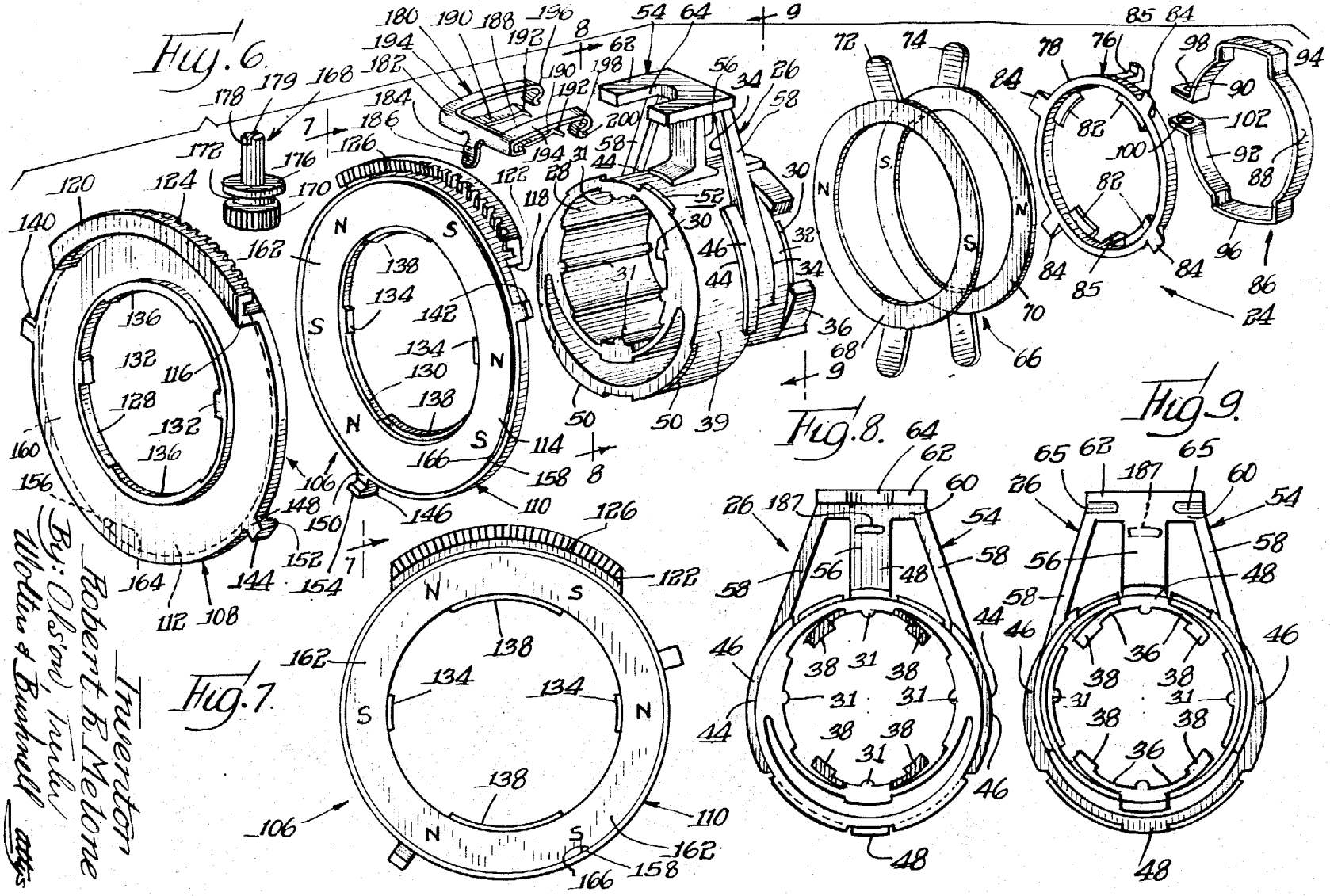
Inventor
Robert R. Melone
By: Olson, Trulu
Wolters & Bushnell attys United States Patent Office Re. 27,209
Reissued Nov. 2, 1971

27,209
BLUE LATERAL AND PURITY MAGNET ASSEMBLY

Robert R. Melone, Des Plaines, Ill., assignor to Illinois Tool Works Inc., Chicago, Ill.

Original No. 3,332,046, dated July 18, 1967, Ser. No. 457,084, May 19, 1965. Application for reissue Nov. 10, 1969, Ser. No. 875,488
Int. Cl. H01f *1/00*
U.S. Cl. 335—212 16 Claims

Matter enclosed in heavy brackets [ ] appears in the original patent but forms no part of this reissue specification; matter printed in italics indicates the additions made by reissue.

*ABSTRACT OF THE DISCLOSURE*

*A magnetic correction device for use with cathode ray tubes wherein a pair of axially contiguous magnetic rings having magnetic pole means thereon are arranged to move in a limited arcuate path relative to one another by a common operator. The device may further include a second pair of magnetic rings which are axially spaced from the first pair of magnetic rings and are mounted relative to a supporting base by a resilient locking ring.*

This invention relates to the magnetic correction of beam positions in cathode ray tubes, and more particularly to a blue lateral and purity magnet assembly for color television picture tubes.

As is known, color television picture tubes as manufactured today comprise discrete dots of phosphors of three different colors. Three electron beams are respectively utilized for exciting the phosphors. Quite precise positioning of the electron beams is necessary for each beam to excite its corresponding phosphor dots. Extraneous magnetic fields and manufacturing variations of color picture tubes may produce misregistration of the beam trios with respect to the associated phosphor dot trios. Compensation is effected by bending the three beams with a magnetic field produced by a pair of purifying magnets. This magnetic field is perpendicular to the tube axis and can be adjusted in magnitude and direction to correct for misregistration between the beam trios and the phosphor dot trios. The correction required must be adjustable from zero up to the maximum correction specified for a given type of tube.

Such magnet assemblies or purifying magnets heretofore have been constructed, and comprise a pair of flat magnetic rings mounted in face-to-face relation about the neck of the picture tube and coaxial therewith. The rings are magnetically polarized with discrete poles at spaced positions about their circumferences. The rings are rotatable relative to one another to determine the composite pole position and intensity, and the rings are rotatable as a unit to determine the direction of correction.

A deflection yoke for the color picture tube is supposed to converge the blue with the red and green beams. As a practical matter, the deflection yoke or radial-converging assembly is not capable of producing complete convergence of the blue and the converged red and green beams. In accordance with the principles of this invention, it is proposed to provide a device which will cause the blue and the converged red and green beams to move horizontally toward each other until they converge at or near the mid-point of the initial separation. This lateral motion of the beams provides a fourth degree of freedom to supplement the three provided by the radial convergence assembly.

In accordance with the present invention, the correction for the horizontal separation is achieved by bending the three beams with the magnetic fields produced by a lateral-converging device. Because the lateral error may be in either direction, and of any magnitude up to the maximum specified for the tube, it must be possible to change the direction of the magnetic fields, and the magnitude thereof over a range sufficient to compensate for the maximum possible error in the tube.

Accordingly, it is an object of the present invention to provide an improved lateral-converging device.

It is a further object of the present invention to provide a device which is readily mounted on the neck of a color picture tube as a unit, and which is adjustable to produce a desired degree and direction of lateral convergence.

A more specific object of the present invention is to provide in combination a blue lateral and purity magnet assembly for color television picture tubes.

Yet another object of this invention is to provide a lateral-converging device for color television picture tubes employing a pair of relatively rotatable ring magnets, magnetized with arcuately spaced poles, and further including means for arcuately and synchronously rotating said magnets relative to one another to provide the desired degree and direction of correction.

Other and further objects and advantages of the present invention will be apparent from the following description when taken in connection with the accompanying drawings, wherein:

FIG. 1 is a side elevational view of the device in place on the neck of a television color picture tube;

FIG. 2 is a vertical axial sectional view through the device of FIG. 1 on an enlarged scale;

FIG. 3 is a horizontal sectional view substantially along the line 3—3 in FIG. 2, and on the scale of FIG. 1;

FIG. 6 is an exploded perspective view of the device;

FIG. 7 is an axial end view of one portion of the device as taken substantially along the line 7—7 in FIG. 6;

FIG. 8 is an axial end view of another portion of the device as taken substantially along the line 8—8 in FIG. 6, being a front end view; and FIG. 9 is a back end view of the device of FIG. 8 as taken substantially along the line 9—9 in FIG. 6.

Figure 5:
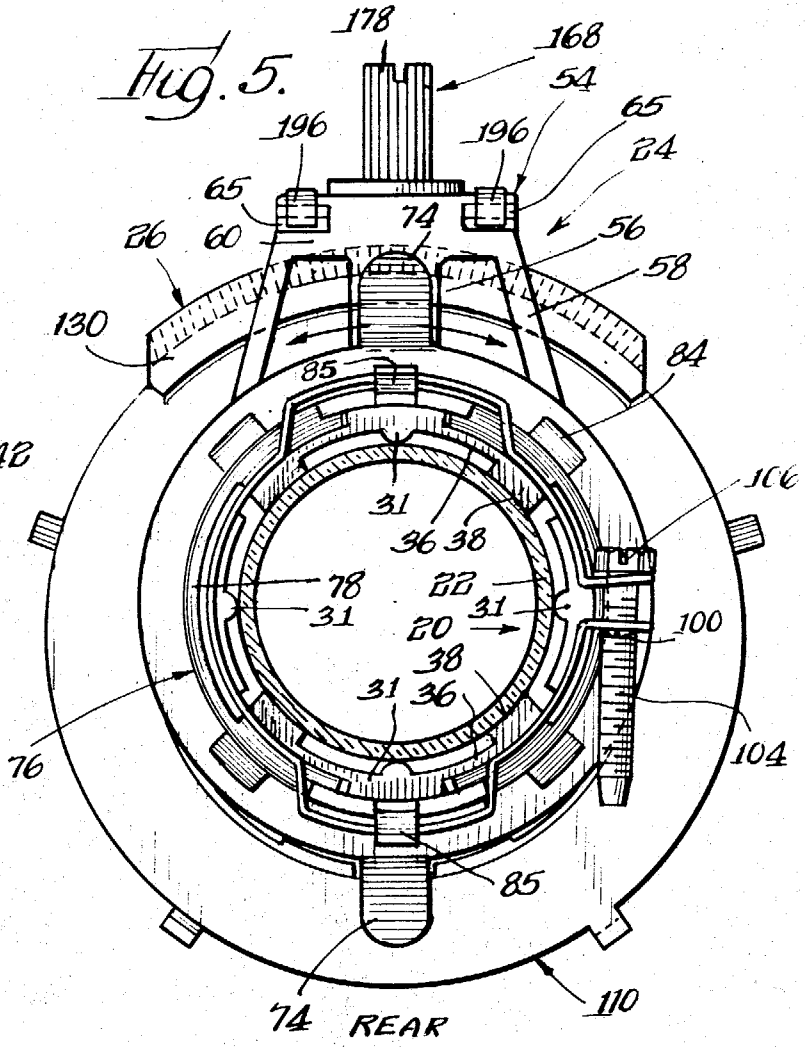
FIG. 5 is a rear axial view of the device as taken substantially along the line 5—5 in FIG. 1.
Figure 4:
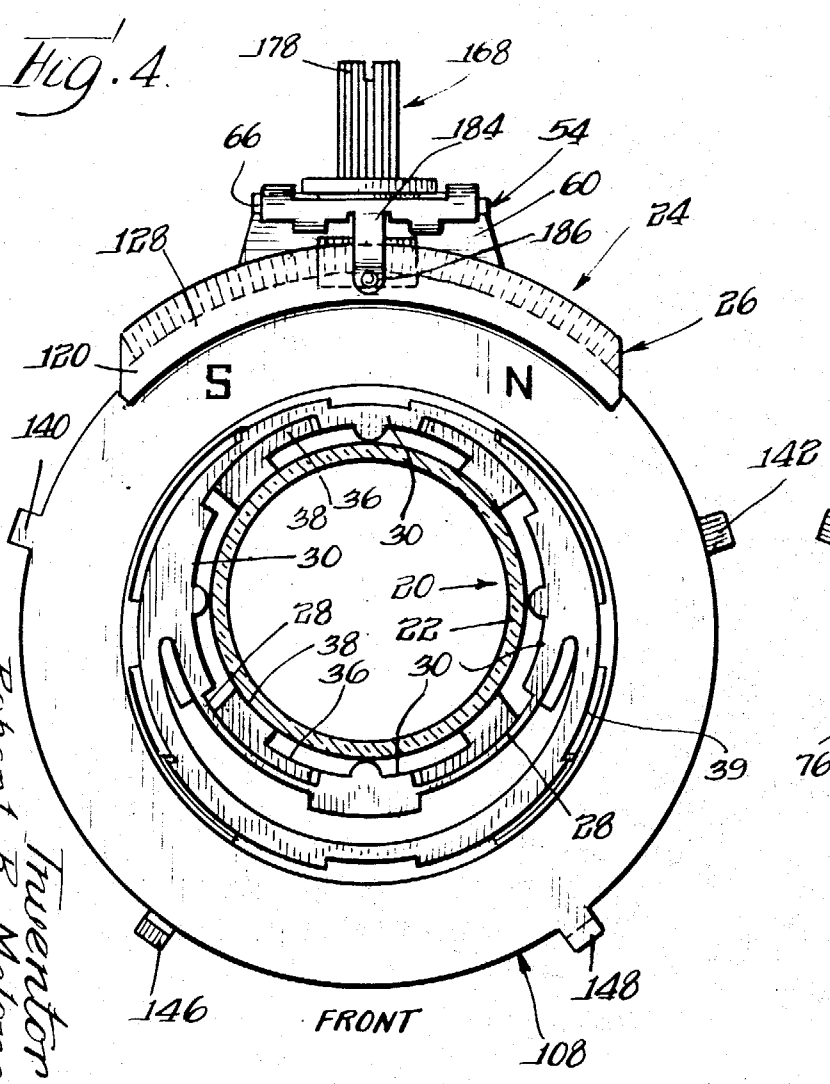
FIG. 4 is a front axial view of the device as taken substantially along the line 4—4 in FIG. 1.

Referring now in greater particularity to the drawings, there will be seen a representation of a color television picture tube, indicated generally by the numeral 20, and having a neck 22 thereon. A blue lateral purity magnet assembly is indicated generally by the numeral 24, and will be seen to be mounted on the neck 22 of the picture tube. This assembly is shown in exploded perspective view in FIG. 6, and various other aspects thereof are to be found in the remaining figures.

The assembly 24 includes a housing or base 26 best seen in FIGS. 6, 8 and 9. It will be appreciated that this housing should have no electrical or magnetic effect on the picture tube. Consequently, the housing is made of moulded plastic material, and polycarbonate is one preferred material. The housing comprises a central cylindrical drum or mounting portion 28, having cylindrical segment inward projections 30 thereon as a result of molding die requirements. These projections are spaced from the neck of the picture tube and each of the four thereof is provided with an axial rib 31 spaced from the picture tube neck, but spaced closely thereto, to prevent or limit skewing of the assembly, which is mounted in a cantilever manner as will appear hereinafter.

The rearwardly extending portion of the cylinder or drum 28 provides a seat 32 of cylindrical nature with shoulders 34 at the front thereof in a common diametral plane. The top and bottom shoulders, are provided by external longitudinal projections. The side shoulders are provided by arcuately relatively long radial extensions, while the top and bottom shoulders are provided by an arcuately relatively short radial extension.

The side projections 30 extend rearwardly slightly beyond the cylinder or drum 28, while the top and bottom projections 30 extend a substantial distance past the rear thereof. The top and bottom projections 30 are provided with symmetrical, opposite arcuately extending flanges or wings 36, each of which is provided at its outer end with a pressure pad 38. The wings 36 are quite flexible, and must be deflected slightly outwardly radially upon assembly of the housing with the neck of the picture tube. The resilient restoring force of the wings is not sufficient to be relied upon permanently to hold the housing in position, and this is taken care of as will be brought out hereinafter.

The housing also is provided with a magnet-mounting cylinder or cylindrical magnet seat 39, which is of larger diameter than the cylindrical tube gripping portion 28, and which is eccentric relative thereto. For example, the center line of the cylindrical tube mounting section is indicated at 40 in FIG. 2, while the center line of the magnet-mounting cylinder 39 is indicated at 42 in the same figure. The walls of the two cylindrical portions are in part coincident. At the bottom part of the housing, the two cylindrical portions are spaced apart.

At the rear of the magnet-mounting cylinder 39, positioning shoulders are provided at 44 by means of relatively long arcuately radial projections 46 on the sides, and arcuately relatively short projections 48 at top and bottom. The top projection 48 also provides a rear upper shoulder 34 previously referred to.

The magnet-mounting cylinder 39 also is provided with top shoulders or stops, and these are such as to require individual attention. There are two lower side projections or shoulders 50 equally spaced about a vertical diameter, and spaced somewhat over 20° apart. Each of these projections or shoulders subtends an arc of about 45°. There are also two upper projections or shoulders 52, likewise symmetrically disposed about a vertical diameter and spaced about 20° arcuately from one another. However, each of the projections or shoulders 52 subtends a substantially smaller arc, say on the order of 20° to 25°. It will be appreciated that the shoulders 50, 52 are disposed arcuately so as to coincide with the spaces between the rear shoulder projections 46, 48 for molding purposes. However, the particular spacing of the front shoulders 50, 52 serves a functional purpose in the assembly now being described, as will be brought out further hereinafter.

In addition to the foregoing, the housing 26 comprises an upstanding bracket 54. This bracket includes a central leg 56 upstanding from the upper projection 48, and further includes a pair of diagonal outer legs 58 extending from adjacent the shoulders 34 up to a transverse web 60 integrally joined to a top horizontal shelf 62 having a substantially U-shaped notch 64 therein opening forwardly. The web 60 is provided on the back side thereof, and at the outer edges thereof with a pair of horizontally disposed notches 65.

The purity magnet assembly 66 comprises a pair of steel rings, namely a front ring 68 and a back ring 70. The ring 68 is provided with two diametrically spaced radially extending tabs 72 which are deflected forwardly, and the back ring 70 is provided with two diametrically spaced radially extending tabs 74 which are deflected to the rear. When both tabs 72 and 74 are aligned in normal position, as shown in FIGS. 1, 2, 5 and 6, the front ring 68 is polarized so that there is a north pole at the left side thereof, as indicated in FIG. 6, while there is a south pole at the right side thereof, 180° opposite. Similarly, the back ring 70 is polarized with the south pole at the left, and the north pole 180° opposite at the right.

With the two rings mounted in face-to-face relation, the magnetic poles shunt or cancel one another and there is a minimum magnetic field strength across the interior of the rings. The two rings can be rotated together by means of the tabs 72 and 74 to set the direction of the magnetic field. On the other hand, the rings can be rotated relative to one another to vary the effective field strength, following which the two rings are rotated as a unit to determine the direction.

The purity magnet assembly 66, comprising the rings 68 and 70, is held in place by a purity magnet retainer 76 of molded plastic material, nylon being a preferred example. The retainer comprises a split ring 78 which preferably is continuous, but which can be split for ease of installation. Four inwardly directed teeth 82 at the back plane of the ring in an arcuately spaced relation fit behind the wings 36 of the housing 26, with the ring 78 surrounding the rear portion of the cylindrical portion 28. The ring further is provided with biasing flanges 84 which are arcuately spaced from one another and which are arcuately aligned with portions of the teeth 82. The biasing flanges 84 are deflected forwardly from the ring 78 as best may be seen in FIG. 2, and are tapered in a radially outward direction, whereby resiliently to bear against the rear ring 70, thus to hold the two rings 68 and 70 resiliently against one another and against the shoulder 34. This holds the magnetic rings 68 and 70 in a desired position, but allows ready circumferential adjustment thereof. Rearwardly projecting hooks 85 are provided to interfit with a clamping ring hereinafter to be described.

As will be appreciated, the natural resilience of the purity magnet retainer 76 and the housing pads 38 allows the ring to be flexed outwardly sufficient for installation. It will be observed that the retainer 76 and the magnetic rings 68 and 70 are coaxial with the cylinder 28 and with the neck 22 of the picture tube 20.

While somewhat out of the logical order of progression as to the functional parts of the invention, it is desirable at the present time to consider the clamp 88 which is located at the rear of the assembly for holding it in position. This clamp, as may be seen in FIGS. 5 and 6, comprises spaced arcuate sections 88, 90, and 92. Offset radially outwardly thereof are arcuate portions 94 at the top and 96 at the bottom, respectively, interconnecting the arcuate portion 88 with the arcuate portions 90 and 92. Lateral ears or flanges 98 and 100, respectively, project radially out from the arcuate portions 90 and 92. Both ears are provided with apertures, and the ear 100 is provided with a helical impression 102 about the aperture. The clamp is received with the arcuate portion 88, 90 and 92, bearing against the wings 36 directly opposite the pressure pads 38. A screw 104 extends down through the ear 98 with the head 106 of the screw bearing against the ear, and with the threaded shank of the screw received in the helical impression 102 of the ear 100. Thus, the clamp 86 forces the pressure pads 38 in against the neck 22 of the picture tube 20 securely, but resiliently, to hold the assembly in position on the neck of the picture tube. It will be appreciated that the radially outwardly offset portions 94 and 96 not only provide for clearance of the rearward extensions of the projections 30, but also equalize pressure on the pressure pads 38 and provide a necessary degree of resilience to prevent unyielding clamping of the pressure pads such as might otherwise inadvertently fracture the neck of the picture tube.

A lateral magnet assembly 106 is mounted on the cylindrical portion 39 of the housing 26. The lateral magnet assembly comprises a pair of like magnet carrier rings 108 and 110 mounted in mirror image relation. The carrier rings should have no effect electrically, and a suitable grade of plastic material is preferred. One satisfactory example is heat resistant A.B.S. plastic. Each ring comprises a web 112, 114 having at the upper portion thereof an axially directed flange 116, 118. The axially directed segmental flanges 116, 118 are terminated by radial flanges 120, 122 having gear teeth 124, 126 thereon facing axially back toward the plane of the respective web 112, 114. Each gear segment 124, 126 and supporting flanges subtends a total arc of about 80°.

Each ring 108, 110 further has at its inner circumference axially extending flanges 128, 130 extending in the same direction as the flange 116. Each ring has radially inward protuberances from this flange. In particular, the ring 108 has diametrically oppositely disposed protuberances 132 lying on a horizontal diameter, while the ring 110 has similar protuberances 134. The protuberances 132 and 134 are of relatively short arcuate extent, being on the order of a total are of 15°. In addition, there are top and bottom protuberance 136 and 138, respectively, on the rings 108 and 110, these protuberances being of greater arcuate extent, on the order of 60°. The protuberances 132, 134, 136 and 138 act as retaining lugs of a bayonet nature, as will be brought out shortly hereinafter.

Each ring further has a radial stop in the nature of a lug 140, 142, each such lug being a short distance above a horizontal diameter, and located to provide a predetermined amount of rotation based upon function, for example 14° above in one specific example. Each lug also is of rather short arcuate extent, on the order of 5°.

Furthermore, each ring has a cooperating stop 144, 146 comprising a radial extension 148, 150, and an axial projection 152, 154 thereon, extending in a direction of the corresponding gear teeth. Each stop 144, 146 also occupies about 6° of arc, and the stop 144 is spaced from the stop 140 on the order of 137°, the stops 146 and 142 being similarly spaced.

Each ring 108, 110 is completed by an axially projecting locating protuberance 156, 158 near the outer circumference and adjacent the lower portion thereof.

A lateral magnet 160, 162 is secured to the face of each web 112, 114 of the rings 108, 110 by a suitable adhesive. Each such magnet is in the form of a flat ring, having magnetic poles at 60° spacings, as indicated in the drawings. Each ring is provided with a locating notch 164, 166 for cooperation with the respective locating protuberances 156, 158, being spaced up 30° from a vertical center line with the lateral magnet assembly in the position shown in the drawings.

The arcuate size and dimension of the lugs 132, 134, 136 and 138 is such relative to the flanges 50, 52 on the magnet-mounting cylinder 39 that with the rings 108, 110 rotated 90° from the position shown in the drawings, the rings can be slipped axially onto the cylinder 39. The radially inner ends of the lugs 132, 134, 136 and 138 form a fairly tight, sliding fit on the surface of the cylinder 39. The lateral magnets 160, 162 ride in face-to-face relationship with their poles relatively reversed, with the parts shown in the position in the drawings, and as will be apparent in FIG. 2, the flanges 128, 130 form a fairly tight sliding engagement behind the flanges 50, 52, and against the shoulders 44.

An adjustment member 168 is provided for the lateral magnet assembly, comprising a pinion 170 of proper diameter to fit between the gear segments 124 and 126 in mesh with both thereof. The adjustment member including the pin is an integral plastic moving, and nylon is one preferred example of a satisfactory plastic material. Immediately above the pinion 170 there is a restricted neck 172 having a boss 174 thereabove with a radially extending circumferential flange 176 above the boss. A knurled finger piece 178 extends upwardly from flange 176 for ready gripping by the fingers to rotate the pinion. In addition, a screw driver slot 179 is provided in the end of the finger piece 178 as an additional means of adjustment if so desired.

The adjustment member is received with the boss 174 thereof (see particularly FIG. 2) in the U-shaped slot 64 of the shelf or platform 62 at the top of the bracket 54. The teeth of the pinion 170 mesh with the gear segment teeth 124, 126, as mentioned previously, and the flange 176 rests on top of the shelf 62. The finger piece 178 is relatively rotated in either direction by the thumb and first finger to adjust the positions of the magnet carriers 108, 110 relative to one another. It will be apparent that the stops 144, 146 engage one another in one direction of rotation to limit rotation in that direction, while the stop 146 engages the stop 140, and the stop 144 engages the stop 142 in the other direction of rotation, thereby limiting the total rotation between the two rings and magnets to an extent that the pinion does not run off the gear segments at either end. It will be observed that the magnetic poles oppose and cancel each other with the rings in the position shown. In the present example with six pole magnets, the rings are each capable of 30° rotation in either direction, a relative rotation of 60°, so that the magnetic poles can reinforce one another. The direction of relative rotation determines the direction (and magnitude) in which the resulting magnetic field will be oriented.

The adjustment member 168 is held in place by a retaining spring 180. The retaining spring is made of a suitable resilient metal, Phosphor bronze being a satisfactory example. The retaining spring includes an elongated front face or web 182 which fits against the front or left edge of the shelf 62 of the bracket 54 as viewed in FIGS. 1, 2 and 6. A central depending finger 184 with a spherical impression 186 near the lower end thereof serves to support the ring gear sector and to insure positive engagement with pinion 170 and to prevent ratcheting therewith. A protuberance 187 on the leg 58 bears on the adjacent ring, and this protuberance and the finger 184 compensate for plastic creep or flow at elevated temperatures. The spring retainer further includes a pair of flanges 188 extending rearwardly from the bottom edge of the web or face 182, and having intermediate fingers 190 extending therefrom beneath the shelf 62, and having a cammed extremity 192 to facilitate installation.

The spring retainer further has a pair of side arms 194 extending to the right in FIGS. 2 and 6, and having at the extremities thereof downwardly turned latching fingers 196 having offsets or detents 198 with outwardly directed end pieces 200. The detents are received in the notches 65 on the brackets 54, thus latching the spring retainer unit in place. The spring retainer can be removed by lifting up the latching fingers 196 and side arms 194 with a finger-nail below the outwardly turned tips 200 thereof.

As will be seen, particularly with regard to FIG. 2, the intermediate legs 190 fit in the restricted neck 172 of the adjustment member to hold the adjustment member in place. Furthermore, the intermediate legs 190 are bowed down so as to bear resiliently against the top edge of the pinion 170 thereby to hold the adjustment member firmly down in place with the flange 176 thereof bearing against the top surface of the shelf 62. This insures against loose fitting of mismatched or off tolerance parts, and provides a friction brake to avoid undesired angular movement of the magnet mounting rings 108, 110.

It will be appreciated that the adjustment member prevents movement to the rings to such a position that they can be axially withdrawn, and effectively provides a self-locking feature preventing rotational movement due to a unidirectional force tending to rotate both rings in the same direction, such as may occur during handling before or after installation on the picture tube.

The structure of the invention has now been disclosed, and it will be apparent that the assembly fits readily on the neck of a color television picture tube, being held in place by the clamp or retaining ring 86. The purity magnets 66 are adjusted individually and together to produce the proper strength and direction to compensate for the earth magnetic field as well as other stray fields that might be present at any particular installation. These magnets, as has been noted heretofore, are concentric with the center line of the picture tube.

The lateral magnets and mounting or carrier rings are adjustable equally and oppositely about an axis which is eccentric relative to the axis of the picture tube. The direction of rotation determines the direction of magnetic correction about a zero or null point, and the degree of rotation determines the strength of the magnetic field, thereby effecting lateral convergence of the blue beam with the red and green electron gun beams. As will be appreciated, the corrections are made while observing the picture tube so that the direction and degree of adjustment can be made empirically.

The specific embodiment of the invention as herein shown and described will be understood as being for illustrative purposes only. Various changes in structure will no doubt occur to those skilled in the art, and will be understood as forming a part of the present invention insofar as they fall within the spirit and scope of the appended claims.

The invention is claimed as follows:

1. A magnetic correction device for use with cathode ray tubes comprising a non-magnetic base, means for mounting said base on the neck of a cathode ray tube, a pair of magnetic rings, each of said rings having magnetic pole means thereon, said rings rotatably mounted on said base in axially contiguous relation, [and] a common operator including means [connected to both] *which directly engages gear segments associated with at least one of* said magnetic rings *for* [and] arcuately moving said rings in equal and opposite directions, *and means associated with said magnetic means which provides only limited predetermined movement of said magnetic rings relative to each other.*

2. A magnetic correction device for use with cathode ray tubes comprising a non-magnetic base, said base having a longitudinal center axis, means for mounting said base on the neck of a cathode ray tube with said base axis eccentric relative to the axis of the cathode ray tube, a pair of magnetic rings, each of said rings having magnetic pole means thereon, said rings rotatably mounted on said base in axially contiguous relation, [and] a common operator including means [connected to both] *which directly engages gear segments associated with at least one* of said magnetic rings for arcuately moving said rings in equal and opposite directions, *and means associated with said magnetic means which provides only limited predetermined movement of said magnetic rings relative to each other.*

3. A magnetic correction device for use with cathode ray tubes comprising a non-magnetic base, means for mounting said base on the neck of a cathode ray tube, a pair of magnetic rings, each of said rings having a plurality of arcuately spaced poles thereon, said rings rotatably mounted on said base in axially contiguous relation with said poles symmetrically oppositely disposed, said rings having a neutral position in which opposite poles of said two rings are aligned and cancel, [and] a common operator including means [connected to both] *which directly engages gear segments associated with at least one* of said magnetic rings for arcuately moving said magnetic rings in either direction equally and opposite to one another to provide a variable magnetic field in either of two directions depending on the relative direction of rotation, *and means associated with said magnetic means which provides only limited predetermined movement of said magnetic rings relative to each other.*

[4. A magnetic correction device for use with cathode ray tubes comprising a non-magnetic base, means for mounting said base on the neck of a cathode ray tube, a pair of magnetic rings, each of said rings having magnetic pole means thereon, means rotatably mounting said rings on said base in axially contiguous relation, each of said rings having means providing a plurality of opposed gear segments fixed relative to said rings, and a common operator including gear means meshing with said opposed gear segments for arcuately moving said rings in equal and opposite directions.]

[5. A magnetic correction device for use with cathode ray tubes comprising a non-magnetic base, means for mounting said base on the neck of a cathode ray tube, a pair of magnetic rings, each of said rings having magnetic pole means thereon, means rotatably mounting said rings on said base in axially contiguous relation, two sets of gear teeth each set being connected to and fixed relative to one of said rings, said sets of gear teeth being in opposition to one another, and a common operator including a gear meshing with both sets of said teeth for arcuately moving said rings in equal and opposite directions.]

6. A magnetic correction device [as set forth in claim 5, wherein] *for use with cathode ray tubes comprising a non-magnetic base, means for mounting said base on the neck of a cathode ray tube, a pair of magnetic rings, each of said rings having magnetic pole means thereon, means rotatably mounting said rings on said base in axially contiguous relation, two sets of gear teeth each set being connected to and fixed relative to one of said rings, said sets of gear teeth being in opposition to one another, and a common operator including a gear meshing with both sets of said teeth for arcuately moving said rings in equal and opposite directions,* each of said sets of gear teeth [comprises] *comprising* a toothed segment, and limit stop means coacting between said rings to prevent said segments from moving beyond said common operator gear.

7. A magnetic correction device for use with cathode ray tubes comprising a non-magnetic base having a cylindrical surface thereon, means for mounting said base on the neck of a cathode ray tube, a pair of magnetic rings, each of said rings having magnetic pole means thereon, means rotatably mounting said rings on said base in axially contiguous relation, said means for mounting said rings including a plurality of arcuately spaced radially inward projections, each of predetermined arcuate extent, a plurality of radially outward projections from said cylindrical surface in arcuately spaced relation and each of predetermined arcuate extent, the projections from said rings axially passing the projections on said cylindrical surface with said rings in a predetermined position of rotational orientation relative to said surface to permit axial assembly of said rings with said surface, said projections preventing axial disassembly with said rings moved from said predetermined position, and a common operator including means connected to both of said magnetic rings for arcuately moving said rings in equal and opposite directions, said operator preventing undesired movement of said rings from said predetermined position.

8. A magnetic correction device as set forth in claim 7, and further including a plurality of face gear segments each being respectively fixed relative to one of said rings and said segments being positioned in confronting relation, and wherein said common operator comprises a gear simultaneously meshing with both of said gear segments.

9. A magnetic correction device for use with cathode ray tubes comprising a non-magnetic base, means for mounting said base on the neck of a cathode ray tube, a first pair of magnetic rings, each of said first pair of rings having magnetic pole means thereon, means rotatably mounting said first pair of magnetic rings on said base in axially contiguous relation, a common operator including means [connected to both] *which directly engages gear segments associated with at least one* of said first pair of magnetic rings for arcuately moving said rings in equal and opposite directions, *stop means associated with said first pair of magnetic means which provides only limited predetermined movement of said first pair of magnetic rings relative to each other,* a second pair of magnetic rings each having magnetic pole means thereon, means rotatably mounting said second pair of magnetic rings on said base in axially contiguous relation to one another, and axially spaced from said first pair of magnetic rings, and means connected to and adapted for rotating said second pair of magnetic rings.

10. A magnetic correction device for use with cathode ray tubes comprising a non-magnetic base, means for mounting said base on the neck of a cathode ray tube, a first pair of magnetic rings, each of said first pair of rings having magnetic pole means thereon, means rotatably mounting said first pair of magnetic rings on said base in axially contiguous relation, means connected to and adapted for rotating said first pair of magnetic rings *including gear segments associated with at least one of said first pair of magnetic means and stop means associated with said first pair of magnetic rings which provides only limited predetermined movement of said first pair of magnetic rings relative to each other,* a second pair of magnetic rings each having magnetic pole means thereon, means rotatably mounting said second pair of magnetic rings on said base in axially contiguous relation to one another and axially spaced from said first pair of magnetic rings, and means connected to and adapted for rotating said second pair of magnetic rings.

11. A magnetic correction device for use with cathode ray tubes comprising a non-magnetic base, means for mounting said base on the neck of a cathode ray tube, said tube having a longitudinal axis, a first pair of magnetic rings, each of said rings having magnetic pole means thereon, means rotatably mounting said rings on said base in axially contiguous relation coaxial with one another and eccentric relative to the axis of said cathode ray tube, means connected to and adapted for rotating said first pair of magnetic rings *including gear segments associated with at least one of said first pair of magnetic means and stop means associated with said first pair of magnetic rings which provides only limited predetermined movement of said first pair of magnetic rings relative to each other,* a second pair of magnetic rings each having magnetic pole means thereon, means rotatably mounting said second pair of magnetic rings coaxially contiguous relative to one another and coaxial with the axis of said cathode ray tube, and means connected to and adapted for rotating said second pair of magnetic rings.

12. A magnetic correction device for use with cathode ray tubes comprising a non-magnetic base, means for mounting said base on the neck of a cathode ray tube, a first pair of magnetic rings, each of said rings having magnetic pole means thereon, means rotatably mounting said rings on said base in axially contiguous relation, means connected to and adapted for rotating said rings on said base, a second pair of magnetic rings each having magnetic pole means thereon, means rotatably mounting said second pair of rings on said base in axially contiguous relation, means connected to and adapted for rotating said second pair of rings on said base, said means for mounting said second pair of rings on said base comprising a resilient locking ring having a plurality of diagonally disposed resilient protuberances resiliently bearing against one of said rings.

13. A magnetic correction device as set forth in claim 12, wherein the means for mounting the base on the neck of a cathode ray tube comprises a plurality of arcuately spaced pressure pads axially spaced from the major portion of said base, resilient means integrally joining said pressure pads to said base, and said locking ring engaging behind said pressure pads to hold said locking ring on said base.

14. A magnetic correction device as set forth in claim 12 and further including a clamp ring, and interengaging means on said locking ring and said clamp ring to prevent relative axial movement of said locking ring and said clamp ring.

15. A magnetic correction device as set forth in claim 14 wherein the interengaging means comprises axially and radially extending hook means.

16. A magnetic correction device for use with cathode ray tubes comprising a non-magnetic base, means for mounting said base on the neck of a cathode ray tube, a first pair of magnetic rings, each of said rings having magnetic pole means thereon, means rotatably mounting said rings on said base in axially contiguous relation, means connected to and adapted for rotating said rings on said base, a second pair of magnetic rings each having magnetic pole means thereon, means rotatably mounting said second pair of rings on said base in axially contiguous relation, means connected to and adapted for rotating said second pair of rings on said base, said means for mounting said second pair of rings on said base comprising a resilient locking ring.

17. A magnetic correction device as set forth in claim 16 and further including a clamp ring, and interengaging means on said locking ring and said clamp ring to prevent relative axial movement of said locking ring and said clamp ring.

18. A magnetic correction device as set forth in claim 17 wherein the interengaging means comprises axially and radially extending hook means.

References Cited

The following references, cited by the Examiner, are of record in the patented file of this patent or the original patent.

UNITED STATES PATENTS

| | | | |
|---|---|---|---|
| 2,525,919 | 10/1950 | Loughren | 335—212 UX |
| 2,568,668 | 9/1951 | Steers | 335—212 |
| 2,954,494 | 9/1960 | Rennick | 313—76 |
| 3,305,744 | 2/1967 | Werst | 335—212 |

GEORGE HARRIS, Primary Examiner

U.S. Cl. X.R.

313—77